United States Patent [19]

Sellen

[11] 4,182,388
[45] Jan. 8, 1980

[54] FLUID COUPLING SYSTEM

[75] Inventor: Kenneth R. Sellen, Dearborn Heights, Mich.

[73] Assignee: Burroughs Corporation, Detroit, Mich.

[21] Appl. No.: 930,375

[22] Filed: Aug. 2, 1978

[51] Int. Cl.² .............................................. B65B 3/04
[52] U.S. Cl. .................................. 141/351; 141/385; 141/384
[58] Field of Search ................................ 141/349-362, 141/291-302, 382-386

[56] References Cited

U.S. PATENT DOCUMENTS

| 1,796,827 | 3/1931 | Butler | 141/385 |
| 3,540,402 | 11/1970 | Kocher | 141/292 |
| 3,587,678 | 6/1971 | Hieber | 141/346 |
| 3,610,297 | 10/1971 | Raaf et al. | 141/383 |
| 4,054,163 | 10/1977 | Brown et al. | 141/291 |

FOREIGN PATENT DOCUMENTS

| 382578 | 11/1964 | Switzerland | 141/351 |
| 325240 | 2/1930 | United Kingdom | 141/351 |
| 543305 | 2/1942 | United Kingdom | 141/385 |

Primary Examiner—Houston S. Bell, Jr.
Attorney, Agent, or Firm—Charles P. Sammut; Carl Fissell, Jr.; Kevin R. Peterson

[57] ABSTRACT

A fluid coupling system employs a cap assembly and a connector assembly to provide a leakproof fluid coupling between a liquid container and a device requiring liquid. The cap assembly consists of a cap, a filler valve assembly, a spring and a cap gasket. The connector assembly includes a pusher stem and a cap guide which operate to provide a sealed fluid passageway thereby preventing any fluid leakage. A tank bay is also utilized to contain any accidental fluid leakage.

4 Claims, 5 Drawing Figures

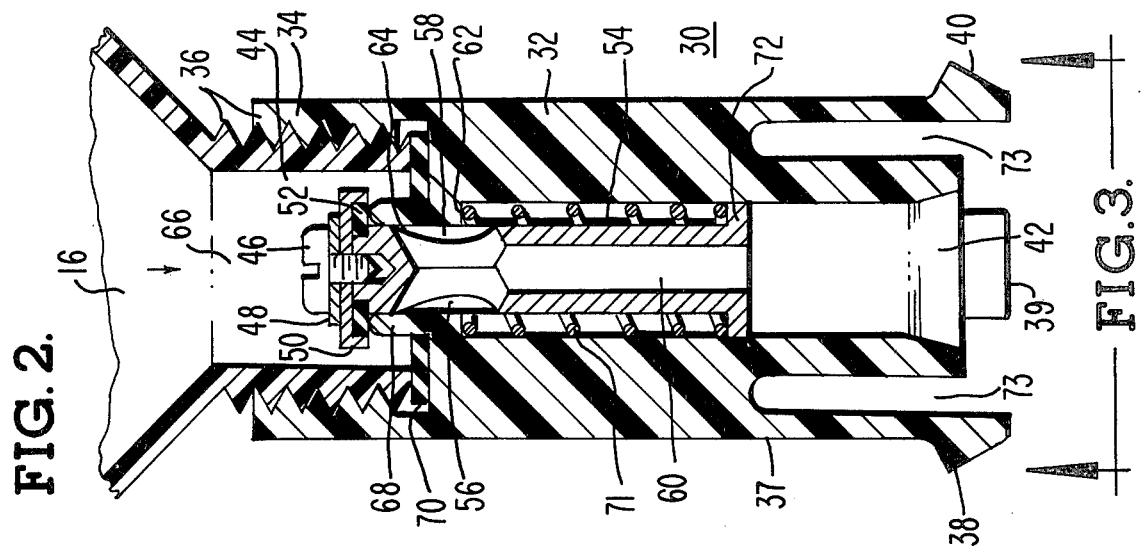
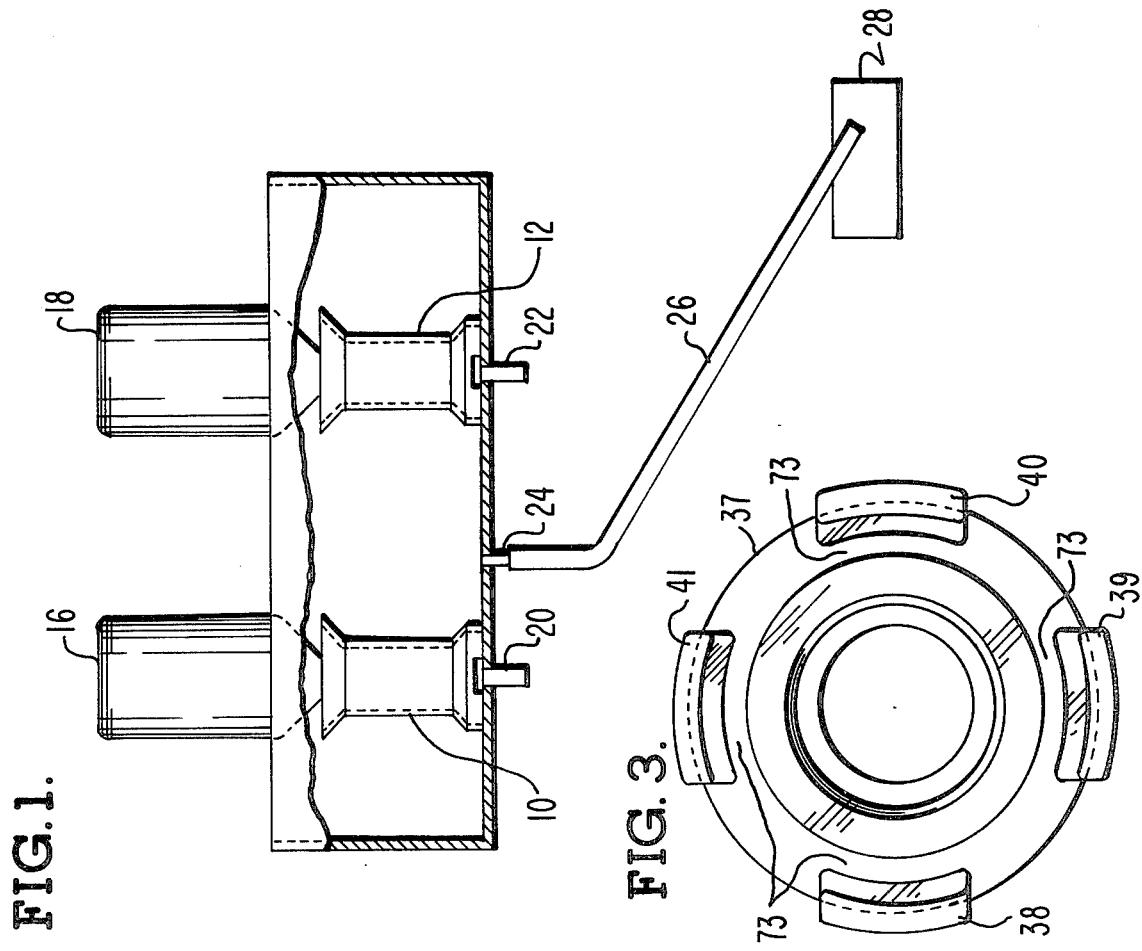

FLUID COUPLING SYSTEM

BACKGROUND OF THE INVENTION

1. Field of the Invention

This invention relates to a fluid coupling system for coupling a liquid container to a device requiring liquid.

2. Prior Art

Devices such as printers which are utilized in data processing applications often use a liquid form of ink as well as a separate source of water. This arrangement is especially common with non-impact printers. In a typical arrangement, in order to add ink, an empty ink tank must usually be removed and inverted. An ink hose is then removed from the empty tank and installed on a new ink tank. This new ink tank must then be turned right side up and then reinstalled. In order to insure adequate ink flow, there must be no kinks in the ink hose. During this procedure care must be exercised since it is very easy for ink to spill either on the person adding the ink or onto the printer.

In order to add water one must press a water tank downward to expose a water fill port, remove a dust cap, and then carefully pour in water from a container of water or the equivalent. Care must be taken to insure that the water is not poured too rapidly, in order to prevent water from overflowing onto the machine or the person.

Accordingly, it is desirable to provide an apparatus for adding ink and/or water to printers or other devices requiring liquids without the problems encountered with the conventional arrangements.

SUMMARY OF THE INVENTION

The present invention is directed toward a fluid coupling system for use with a device requiring liquids. The system employs a cap assembly and a connector assembly to provide a leakproof passageway between a liquid tank and a liquid input port. The fluid coupling system effectively seals the inside of a tank from the environment thereby preventing leakage.

Other objects, advantages and applications of the present invention are made apparent by the following detailed description of the preferred embodiment of the invention.

BRIEF DESCRIPTION OF THE DRAWINGS

FIG. 1 shows a sectional view of a preferred embodiment of the invention wherein each of two fluid couplings is installed within a tank bay to thereby prevent any accidental spillage from entering critical areas of a device requiring liquids, such as a printer;

FIG. 2 is a sectional view of a preferred embodiment of a cap assembly attached to a fluid container;

FIG. 3 is an end view of the cap assembly of FIG. 2;

DESCRIPTION OF THE PREFERRED EMBODIMENT

Figure 5:
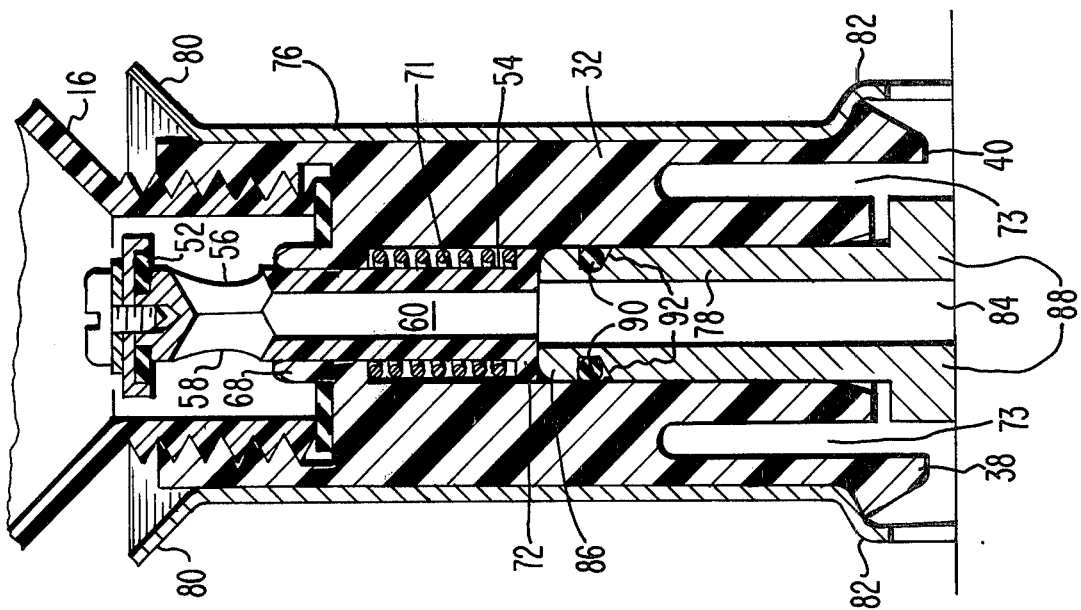
FIG. 5 is a sectional view of the cap assembly of FIG. 2 attached to the connector assembly of FIG. 4.

Referring to the drawings, FIG. 1 discloses a typical application of the preferred embodiment of the invention. A pair of fluid couplings 10 and 12 are mounted within a tank bay 14. At the top of each of the fluid couplings 10 and 12 are fluid containers 16 and 18, respectively. The fluid coupling 10 has its lower end connected to a liquid input port 20, and the fluid coupling 18 has its lower end connected to a liquid input port 22. A drain port 24 approximately midway between the fluid couplings 10 and 12 connects the bottom surface of the tank bay 14 to a drain hose 26. The other end of the drain hose 26 is connected to a sump 28.

FIG. 2 discloses a cap assembly used with the system of FIG. 1 generally at 30. Since both fluid couplings 10 and 12 are identical, only coupling 10 will be described in detail. Attached to the cap assembly 30 is the fluid container 16. The cap assembly 30 includes a cap 32 having a set of threads 34 which interlock with a set of threads 36 on the neck of the container 16. As shown in FIGS. 2 and 3, the cap 30 has a cylindrical outer shape with an outside wall 37 which extends to form the outer portion of a set of four cap fingers 38, 39, 40 and 41. A first cap bore 42 accommodates linear movement of a filler valve assembly 44.

The filler valve assembly 44 consists of a screw 46, a screw seal 48, a seat 50, a seat gasket 52 and a filler stem 54. The seat gasket 52 is positioned within a circular recess within the seat 50. The screw 46 secures the screw seal 48, the seat 50 and the seat gasket 52 to the filler stem 54. The filler stem 54 includes a pair of fluid inlets 56 and 58 and a cylindrical passageway 60.

The first cap bore 42 extends from one end at the cap 32 to an inner shoulder 62. A second cap bore 64 connects the first cap bore 42 and a third cap bore 66 to thereby form a ridge 68. The ridge 68 contacts the seat gasket 52 to provide a liquid-tight seal when the cap assembly 30 is not engaged. A gasket 70 is positioned at the lower end of the third cap bore 66 to provide a liquid-tight seal between the end of the neck of the container 16 and the cap 32.

A helical spring 71 is set between a shoulder 72 of the filler stem 54 and the inner shoulder 62 of the first cap bore 42. The spring 71 operates to insure a tight contact between the seat gasket 52 and the ridge 68 when the cap 30 is not engaged. A circular groove 73 at the lower end of the cap 30 allows the cap fingers 38, 39, 40 and 41 to easily flex.

Figure 4:
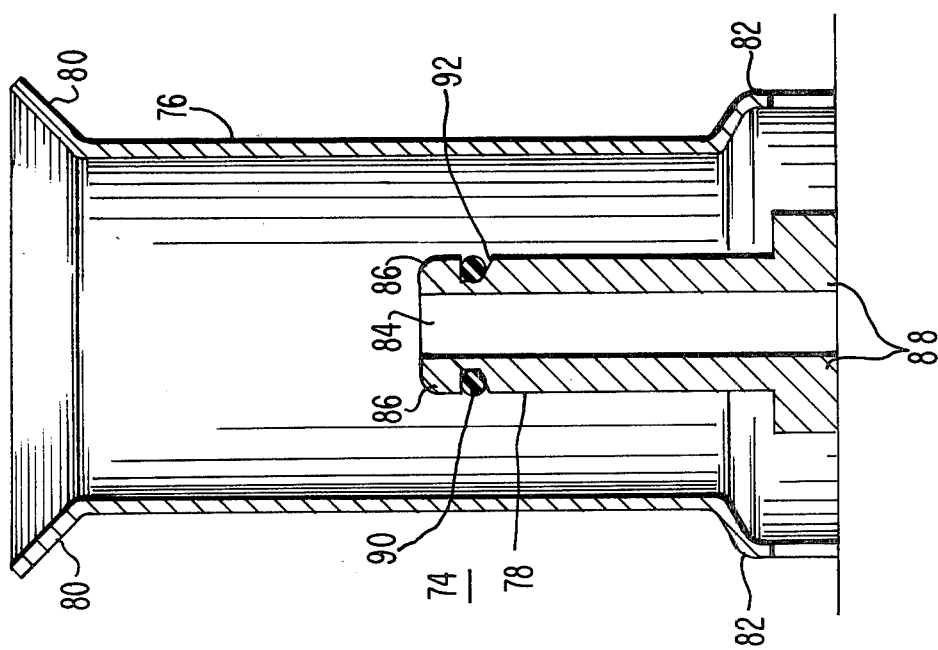
FIG. 4 is a sectional view of a preferred embodiment of a connector assembly.

FIG. 4 shows a connector assembly generally at 74. The connector assembly 74 consists of a cap guide 76 and a pusher stem 78. The cap guide 76 is a cylindrical chamber having a flared portion 80 at one end and a shoulder portion 82 near the opposite end. In the preferred embodiment of the invention both the cap guide 76 and the pusher stem 78 are secured to the body of a printer or other similar structure as shown in FIG. 1. The pusher stem 78 contains a cylindrical passageway 84, an upper end 86 having spherical corners and a shoulder 88 at its lower end. An O-ring 90 is secured in an annular groove 92 near the upper end 86.

Referring to FIG. 5, when the cap assembly has not yet been inserted into the connector assembly, the spring 71 exerts a force on the filler stem 54 in the direction away from the tank 16. This force causes the seat gasket 52 to be pressed against the ridge 68 thereby forming a liquid-tight seal to keep fluid contained within the tank 16.

As the cap 32 is inserted into the cap guide 76, the cap guide 76 guides the cap 32 to permit the pusher stem 78 to enter the first cap bore 42. As the pusher stem 78 enters the first cap bore 42, the walls of the first cap bore 42 compress the O-ring 90 thereby creating a liquid-tight seal. As the pusher stem 78 enters further, its upper end 86 displaces the shoulder 72 thereby causing the liquid-tight seal between the seat gasket 52 and the ridge 69 to be broken. This permits fluid to enter the fluid inlets 56 and 58, through the fluid passage 60 and downward into the fluid passage 84 within the pusher stem 78. Finally, the cap fingers 38, 39, 40 and 41 (only the fingers 38 and 40 are shown in FIG. 5) snap outward as they pass over the shoulder 82 thereby locking the cap assembly in place.

If the cap assembly 30 together with the liquid tank 16 is removed before the tank 16 is empty, a certain amount of fluid will be trapped within the passageway 60. This fluid escapes as air replaces its volume. As shown in FIG. 1, in order to prevent this fluid from entering critical areas of a printer, the tank bay 14 routes any escaping liquid to the drain port 24. Gravity causes liquid at the drain port 24 to flow through the drain hose 26 into the sump 28. In the preferred embodiment of the invention the tank bay 14 is of sufficient leakproof volume to contain the fluid of both the tanks 16 and 18. Thus, if the drain hose 26 becomes obstructed the tank bay 14 would not overflow should both the tanks 16 and 18 empty into the tank bay.

The preceding detailed description of a specific embodiment is but one adaptation of the present invention. The invention is adaptable to a range of embodiments which will suggest themselves to those skilled in the art without departing from the scope and essence of the appended claims.

Having thus described my invention, I claim:

1. A fluid coupling system for connecting a liquid container to a device liquid input port comprising:
   a cap assembly having a pair of arcuate fluid inlets connected to a first fluid passageway, operative to permit the flow of the liquid from said liquid container;
   a pusher stem having a second fluid passageway operative to form a single sealed passageway consisting of said first and second fluid passageways, to thereby permit liquid to flow from said liquid container through said arcuate fluid inlets through said single sealed passageway into said liquid input port when said pusher stem presses against said cap assembly; and
   a cap guide surrounding said pusher stem, said cap guide having a flare at one end and a shoulder approximate to the opposite end, operative to secure said cap assembly.

2. The fluid coupling system of claim 1 wherein said cap assembly further comprises:
   a cap having a first inner bore and a second inner bore;
   a filler valve assembly extending from said first inner bore to said second inner bore; and
   a spring positioned between said filler valve assembly and said first inner bore operative to exert force on said filler valve assembly.

3. The cap assembly of claim 2 wherein said cap further comprises:
   a set of threads integrated within the surface of said second cap bore.

4. The cap assembly of claim 2 wherein said filler valve assembly comprises:
   a filler stem having a first end and a second end with a shoulder located at said first end; and
   a seat attached to said second end of said filler stem.

* * * * *